Oct. 18, 1966  F. G. ZAGAR  3,279,268
MULTIPLE SPINDLE DRIVE MEANS
Filed Dec. 9, 1963  2 Sheets-Sheet 1
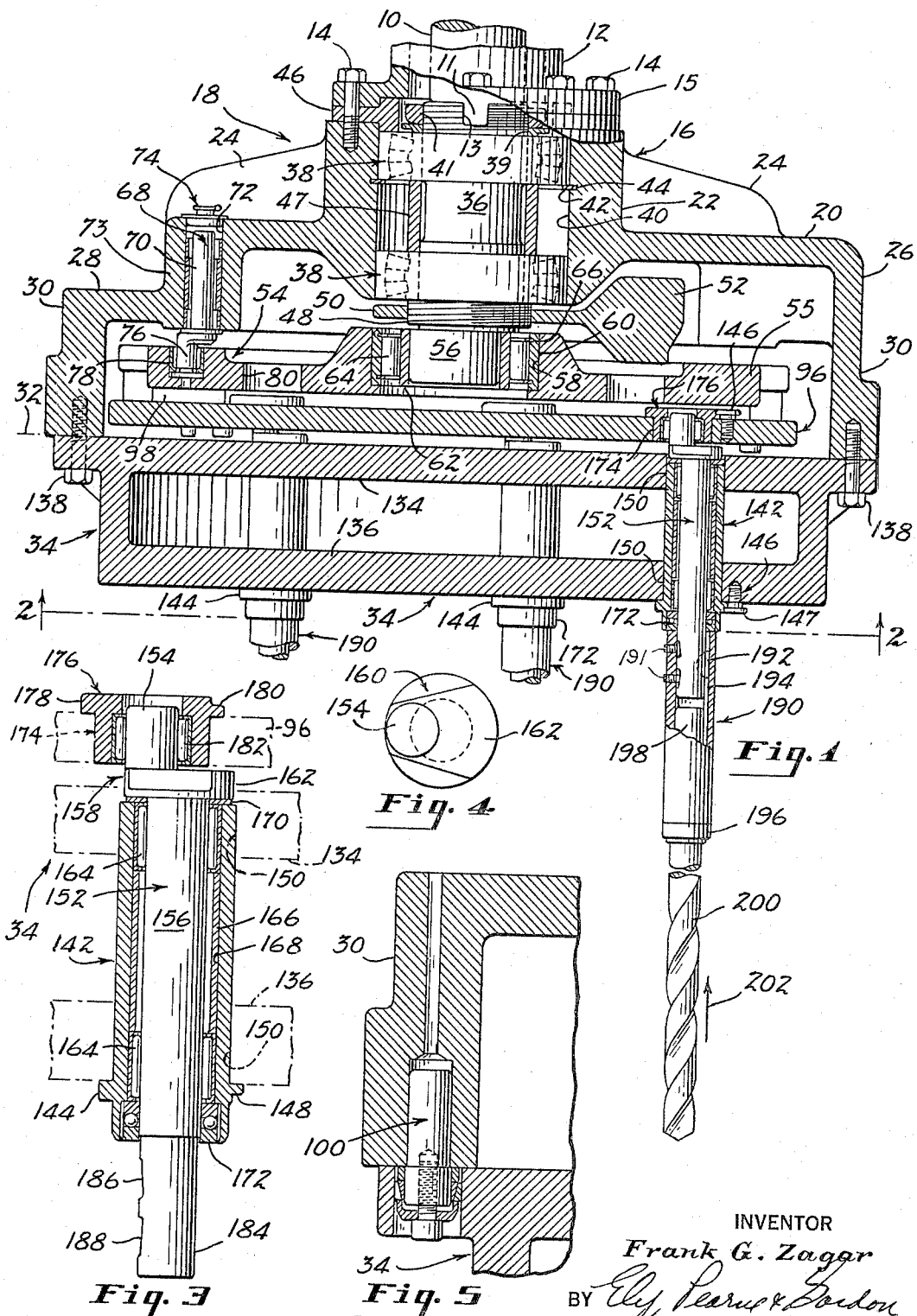
INVENTOR
Frank G. Zagar
BY Ely, Pearne & Gordon
ATTORNEYS Oct. 18, 1966          F. G. ZAGAR          3,279,268
MULTIPLE SPINDLE DRIVE MEANS
Filed Dec. 9, 1963          2 Sheets-Sheet 2
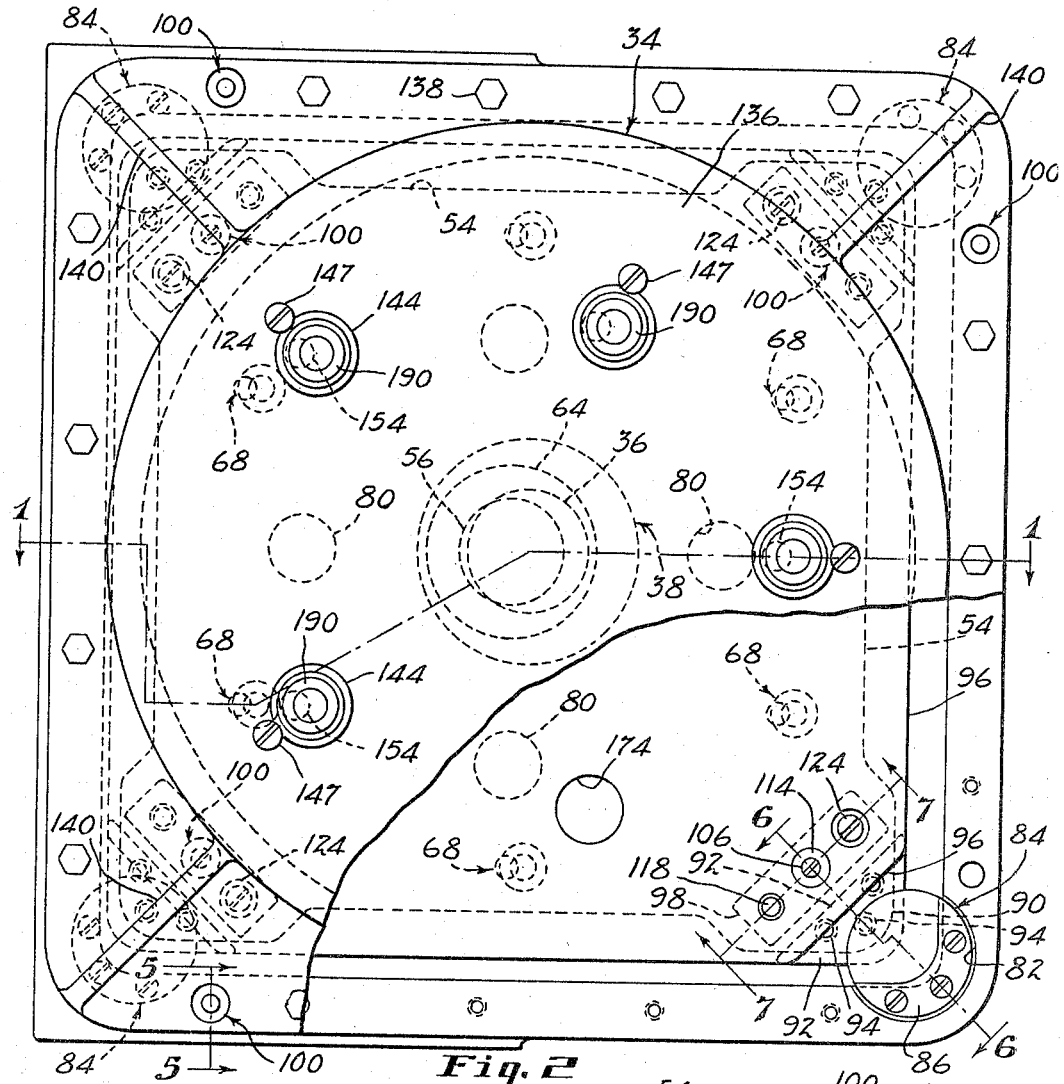
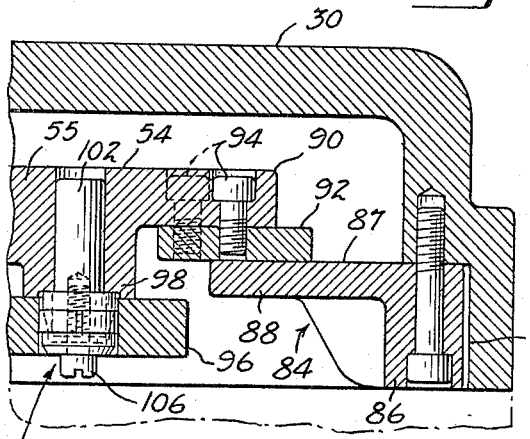
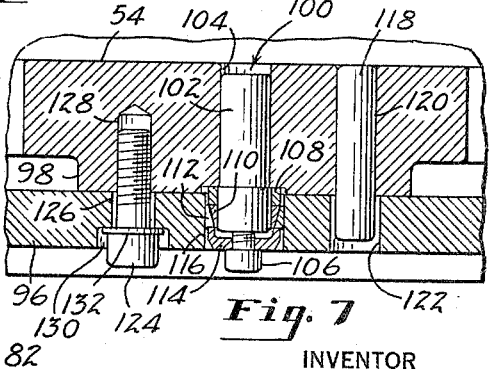
INVENTOR
Frank G. Zagar
BY
ATTORNEYS United States Patent Office 3,279,268
Patented Oct. 18, 1966

3,279,268
MULTIPLE SPINDLE DRIVE MEANS
Frank G. Zagar, Cleveland, Ohio, assignor to Zagar, Inc., Cleveland, Ohio, a corporation of Ohio
Filed Dec. 9, 1963, Ser. No. 328,833
15 Claims. (Cl. 74—63)

This invention relates to gearless spindle drives; and more particularly to gearless, multiple spindle drives wherein the spindles can be quickly changed both as to size and pattern without changing the balance of any part of the unit.

THE PRIOR ART AND PROBLEM

Heretofore, gearless multiple spindle drives have achieved substantial application in industry. Their great versatility in pattern machining operations, such as pattern drilling, makes them adaptable to production operations outside the capabilities of any other machine. The versatility arises from the fact that these gearless drives are capable of producing holes in closely spaced patterns; e.g. on closely spaced centers. This will become apparent when the general array of such a mechanism is explained. Thus, these units comprise the following basic elements:

(a) A drive spindle having an eccentric crank pin;
(b) A drive plate operatively connected to the crank pin to be moved in a translatory manner by rotation of the drive spindle. Translatory motion is defined as motion in which all points of a moving body have at any instant the same velocity and direction of motion—in contrast to, or as distinct from, rotation. Thus, it can be said that the drive plate defines a translatory motion in a circular path, and thus it moves through a circular path but does not rotate. A non-rotary, eccentric-type motion.

The drive plate is provided with a plurality of recesses or openings to operatively receive crank pins of plural work spindles.

(c) The other component of the unit is a carrier for the work spindles. This unit is fixed and journals the shanks of the work spindles and allows them to rotate as the cranks thereof are turned by the translatory movement of the drive plate.

Adavntages of this gearless mechanism become apparent when it is understood that the throw of the crank pin of each work spindle can be made very small. For example when drilling one-eighth inch holes, a throw of approximately one-quarter inch is adequate. In another instance, work spindles for one-sixteenth inch drills may have centers as close as .125 inch. This means that the work spindles can be spaced more closely than any other multiple drill machine.

A characteristic of the earlier units was, however, that each pattern of drilling required a particular and careful counterbalancing of the drive plate. Further, in prior units, each drive plate was provided with a particular pattern of bushing holes to establish the particular pattern of work spindles. Thus, to change a pattern, it meant that a new drive plate had to be manufactured and put in place of that one in the machine. This required disassembling the machine and installing the new drive plate; and, further, carefully counterbalancing the new drive plate in accordance with the pattern of bushing holes and new spindle crank pins contained therein.

It will be evident that since the drive plate travels in a translatory or eccentric pattern, it must be kept in very careful balance with a counterweight in order to provide high speed operation. For precision work, of course, vibrationless operation is absolutely necessary.

As the art progressed, quick-change developments came into being. One unit comprised a drive plate insert and a carrier insert, all patterned as desired for a particular job. This still necessitated custom counterbalancing of the drive plate after the drive plate insert was changed. These quick-change units made short run drilling operations more profitable because of shorter down-time of the machine for a change over.

As the art progressed further, the drive plate was provided with plural holes to receive cranks of work spindles of different sizes in various patterns, it being understood that any particular pattern might not utilize all of the holes. By operating in this manner, and by use of appropriate bushings for the different size crank pins of the work spindles and appropriate bushings for the different size shanks of the work spindles, differing patterns of differing drill sizes could be set up. However, this required especially careful counterbalancing of the drive plate in accordance with each pattern. Balancing was difficult because the different sizes of bushings and work spindles in a single pattern produced tricky balancing problems. This tended to limit the greater flexibility of these units.

From the foregoing, it is evident that a substantial advance to the art would be provided by a gearless, multiple spindle drive unit adapted to rapid, repetitive production, accuracy through vibrationless operation; quick-change of a drill or other tool pattern for short runs; and intermixture of both work spindle size and pattern, all without disturbing the balance of the unit in the least.

It is accordingly an important object of the present invention to provide an improved, gearless, multiple spindle drive wherein the work spindles can be quickly changed both as to size and pattern without changing the balance of the unit.

It is a further object of the invention to provide an improved, gearless, multiple spindle drive wherein a variety of sizes of work spindles can be "slipped" into position for a predetermined pattern of drilling or work operation, and without disturbing the balance of the drive plate.

A further object is to provide an improved, gearless, multiple spindle drive employing a unique mounting for the drive plate.

A still further object is to provide a gearless, multiple spindle drive unit wherein the work pattern can be changed without removing either the drive plate, or oscillator insert, or bottom plate; as distinguished from units of the prior art; and all without disturbing the balance of the unit in any way.

Other objects of this invention will appear in the following description and appended claims, reference being had to the accompanying drawings forming a part of this specification wherein like reference characters designate corresponding parts in the several views.

FIGURE 1 is a sectional view of a multiple spindle drive of invention, taken along the line 1—1 of FIGURE 2;

FIGURE 2 is a bottom plan view of the unit of invention as taken along line 2—2 of FIGURE 1 and with parts partially broken away to show otherwise concealed components and constructional features;

FIGURE 3 is an enlarged axial, sectional view taken through the slip spindle of invention as employed in the unit of FIGURES 1 and 2;

FIGURE 4 is a top plan view of the work spindle crank of invention as shown in FIGURE 3, and showing the manner of counter-balance and, when taken with FIGURE 3, shows the manner in which the crank pin thereof operates within a circle of the outside diameter of the sleeve carrying the work spindle;

FIGURE 5 is an enlarged sectional view through an automatic centering pin mechanism used to accurately locate the replaceable slip spindle plate relative to the main housing of the unit;

FIGURE 6 is an enlarged, fragmentary, sectional view taken along line 6—6 of FIGURE 2, showing a support and bearing pad for the drive plate; and the use of an expanding locator pin assembly for accurately aligning or indexing the oscillator insert relative to the drive plate; and FIGURE 7 is an enlarged fragmentary, sectional view along line 7—7 of FIGURE 2, showing a foolproof pin, combined with an expanding locator pin assembly for accurately indexing the oscillator insert relative to the drive plate.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

THE ENVIRONMENTAL SURROUNDINGS

The environmental surrounding of the present invention, as briefly alluded to above, is a gearless, multiple spindle head of the parallel motion driving plate, or translatory motion driving plate type. At this point, it should be stated that these units are generally used in association with spindle machines of the drilling or tapping type; such machines being characterized by a rotatable and axially movable spindle. In the case of a drill press, the spindle is normally fitted at its free end with a chuck to receive a drill or other cutting tool. Axial movement, or as is generally the case for such machines, vertical movement of the spindle, permits the tool to traverse a workpiece held on a horizontal table or bed of the machine. Of course, it is known that there are horizontal baring mills of the heavier duty type which also use a work spindle, rotatable and axially movable, in order to traverse the tool into and from a workpiece. The present invention is applicable to either type, and also to known types of tools where feeding is accomplished by moving the work toward the spindle rather than by moving the spindle toward the work.

The multiple spindle head is provided with a quill adaptor by which it is secured to the machine. An operable connection is made between the work spindle of the machine and the power spindle of the multiple spindle head.

Now turning to FIGURE 1, the environmental surrounding in which the present invention operates will be specifically described. Thus, in FIGURE 1, the work spindle of a machine tool such as a drill press is designated by the reference numeral 10. This is axially movable and rotatable. It will be noted that the bottom end of spindle 10 is provided with a male tip 11.

A quill adaptor 12, of sleeve-like configuration, is fastened by means of bolts 14 through annular flange 15 to the top end of housing 16 of multiple spindle drive head 18. This connection to the machine tool provides axial movement, so that the tools carried by the multiple spindle head can be fed to and removed from a workpiece.

Housing

The housing 16 may be described as a generally inverted box-like structure having a top wall 20. A generally cylindrical and tubular support shell or casing 22 extends above top wall 20 for mounting a drive crank, to be described. A plurality of radially extending reinforcing webs 24 are utilized, as will be evident to those skilled in the art, for rigid construction commensurate with minimum weight.

An annular side wall 26 extends downwardly from top wall 20 and blends with a secondary top wall 28. This latter wall is of generally square configuration and is surrounded by a secondary or lower side wall 30. Side wall 30 terminates at its bottom edge on a flat plane represented by line 32. This provides an accurate surface to which a slip spindle plate 34 is detachably secured.

Drive crank

Returning now to the drive crank, designated by the reference numeral 36, it will be noted that such unit is of generally cylindrical structure. The drive crank may be supported by axial thrust roller bearings 38, one adjacent the top end and one adjacent the bottom end for stability.

It is to be noted that the casing 22 is bored at 40, and the cages of bearings 38 are provided as a hand-tight slip fit therein. The upper bearing 38 is bottomed against a retainer ring 42 carried in an annular groove 44 of bore 40. Retainer ring 42 takes the compression of the cage of the bearing as applied by a retainer plate 46. A spacer sleeve 47 positions the bottom bearing 38 against the shoulder of a threaded boss 48.

The race of upper bearing 38 is held by a retainer ring 39 kept in place by a nut-lock washer unit 41.

Rotation of drive crank 36 is effected through an interconnection with spindle 10. This comprises a female recess 13 in the top end of crank 36 to receive the tip 11. Thus spindle 10 and crank 36 are locked together.

Counterweight

The purpose of the boss 48 is to support a counterweight assembly having an annular plate-like body 50, which carries counterweight 52 at the periphery. Proper position of the counterweight 52 counterbalances the drive crank 56, and the drive plate 54, which the drive crank moves in a crankshaft-like manner.

The drive plate

The drive plate 54, as best seen in FIGURE 2, is a generally square, platelike unit, nested within wall 30 with clearance for translatory, circular movement.

This unit is supported at each corner on bearing pads 92 floating on support pads 84, which assemblies will be described in detail later. The point here is that as the crank pin 56 moves in a translatory, circular motion, it propels or moves the drive plate 54 with the same motion. The bearing pads 92 and support pads 84 support the bottom of the drive plate 54. The bearing connection between the crank pin 56 and the drive plate provides top support.

Referring now to FIGURE 1, note that the drive plate 54 is provided centrally with a bore 58, into which a bearing retainer ring 60 is fitted. Crank pin 56 is provided with an adapter sleeve 62 whereby bearings 64 of various sizes can be accommodated depending upon the amount of power being transmitted.

Bearing 64 is held in place by upper and lower retainer rings 66.

Bearings 38 are lubricated by means of an oil mist converter, not shown. Bearing 64 may be similarly lubricated.

To provide controlled, translatory, circular motion to drive plate 54, outboard idler cranks 68 are employed. Several of these units are utilized, as indicated in FIGURE 2, assuring precision motion of the drive plate 54.

Idler units 68 each comprise a crank pin 70 mounted in bearings carried in suitable apertures 72. These are located in bosses 73 in spaced annular array around the unit, as indicated in FIGURE 2. All of the idler units 68 are in accurate axial alignment, and truly transverse to the axis of the drive plate.

The anti-friction bearings used to journal crank pins 70 are lubricated through oiler caps 74 mounted in wall 20.

Each idler crank has an eccentric crank pin 76 and these are received in anti-friction bearings carried in appropriate apertures 78 formed in drive plate 54.

In order to reduce the mass of drive plate 54, the metal is omitted at apertures 80.

THE BEARING PAD-SUPPORT PAD ASSEMBLIES FOR THE DRIVE PLATE

This construction is best shown in the sectional view of FIGURE 6, and in FIGURE 2, where the section of FIGURE 6 was taken.

Note that the housing wall 30 is provided with a semi-circular recess 82 to receive a support pad 84. Support pad 84 comprises a semicircular body portion 86 and a transversely extending arm portion 88 having a flat upper bearing surface 87. As shown in FIGURE 2, each arm portion 88 is of generally circular configuration.

Drive plate 54, at its corners, is removed to provide an outwardly extending and exposed support lip 90 to which bearing pad 92 is fastened. The fastening is effected by bolts 94 passed through suitable holes in support lip 90, and turned into threaded apertures of bearing pad 92.

The upper bearing surface 87 of arm portion 88 is provided with an oil recess, not shown. Thus, lubrication between bearing pad 92 and the surface 87 is provided to float the drive plate 54 on a film of oil.

THE OSCILLATOR INSERT

An important aspect of the present invention resides in an oscillator insert, and this element is designated 96 in FIGURE 1. By the use of a single oscillator insert, different patterns of work spindles, and also different sizes of work spindles can be established. This can be done without disturbing the balance of the previously dynamically balanced drive plate 54.

However, before discussing the features of the oscillator insert and its cooperation with the other elements of invention, it is pertinent to point out the mounting details of the oscillator insert 96 to the drive plate 54.

For such description, refer to FIGURES 6 and 7, and also to FIGURE 2 for the manner in which the sections were taken. Thus, at each corner, the drive plate 54 is provided with bosses 98 that project downwardly from platelike body 55 of the drive plate.

As shown in FIGURE 7, three units provide exact indexing and attachment of oscillator insert 96 relative to drive plate 54. The first of these is an expanding locator pin assembly 100. One unit 100 is placed at each corner. This comprises a cylindrical body or pin 102, mating a bore 104 in press-fitted relation. The bottom end of pin 102 is coaxially bored and internally threaded to receive bolt 106.

Sleeve 108 slides over pin 102 and bottoms against drive plate 54. Inner and outer annular wedge members 110 and 112 are next applied, as indicated, and annular collar 114 is forced into abutting relation with outer wedge 112. This centers the axis of aperture 116 of oscillator insert 96 accurately relative to the axis of bore 104 of drive plate 54.

A foolproof pin 118 is provided in bore 120. Several of these are set in a specific pattern in drive plate 54. A matching pattern of bores 122 is formed in oscillator insert 96 so that oscillator 96 can only be applied to the drive plate 54 in one position. When the oscillator insert 96 has been pre-balanced by balance of its mass relative to its center or axis; and the drive plate 54 assembly pre-balanced, such pre-balance of both units remains in the assembled condition of parts.

It is to be noted from FIGURE 2 that the same type of highly accurate indexing of oscillator insert 96 to drive plate 54 is provided at each corner of the two units.

Attachment of oscillator insert 96 to drive plate 54 is effected by means of bolts 124. The bolts 124 are passed through appropriate apertures 126 in oscillator insert 96 and into threaded apertures 128 of drive plate 54. To allow for drift between aperture 126 of oscillator insert 96 and threaded aperture 128 of drive plate 54, the aperture 126 is countersunk at 130. The head of bolt 124 is bottomed against a washer 132 so that there is positive engagement between the head of the bolt 124 and bottom of countersink 130. This assures a gripped, assembled relationship of parts.

THE SLIP SPINDLE PLATE

In the previous description, the slip spindle plate of invention has been referred to by the reference numeral 34. This is shown in FIGURE 1 as having parallel, spaced upper and lower walls 134 and 136. Upper wall 134 is of generally square configuration extending edgewise to the outside face or dimension of secondary side wall 30 of housing 16. Bolts 138 around the periphery are effective to hold slip spindle plate 34 in attached relationship to housing 16.

As shown in FIGURE 5, at least one expanding locator pin assembly 100, as described relative to FIGURE 7, is utilized for accurate indexing of the parts 34 and 16 relative to one another.

THE SLIP SPINDLE ASSEMBLIES

Before discussing this feature of the invention, it should be noted that only one slip spindle assembly is being described in detail. By reference to FIGURE 2, it will be understood that several of these units are utilized for pattern drilling and the like. However, the broad scope of invention is to be construed as a spindle drive assembly that may have only one such slip spindle assembly utilized in its construction.

Each slip spindle assembly comprises a sleeve 142, FIGURE 3. At its bottom end, such sleeve has an annular shoulder 144 that abuts the bottom side of lower wall 136 of slip spindle plate 34. This locates the sleeve 142. The manner of fastening is illustrated in FIGURE 1. As there shown, a screw 146 has an enlarged head 147. Head 147 engages an arcuate flat 148 formed in shoulder 144 of sleeve 142, FIGURE 3. This provides an assembled relationship of parts. In asmuch as the sleeve 142 is a slip-fit in axially aligned apertures 150, removal is readily effected by withdrawing screw 146 and pulling the unit down and out.

The drive spindle crank 152 includes an eccentric crank pin 154 at the top end of shank 156. The crank pin 154 is connected to the shank 156 by means of a crank head structure 158 that counterbalances the weight of the crank pin 154 with respect to the axis of rotation of the shank 156.

As shown in FIGURE 4, this is effected by removing metal in the areas 160, while leaving a built-in counterbalance structure 162.

Shank 156 is journalled in upper and lower anti-friction bearings 164 that are pressed into each end of the bore 168 of sleeve 142.

A thrust washer 170 is fitted between the top end of sleeve 142 and the bottom side of counterbalance 162 to relieve friction at this point. Very little thrust is actually absorbed by this washer 170 because, as will become evident later, the main axial thrust of the drill bit or cutting tool is absorbed by the sleeve 142.

At the bottom end, a ball type axial thrust bearing 172 is fitted over shank 156. Pressure applied against this bearing, is absorbed by sleeve 142 through flange 144 and transferred into lower wall 136 of slip spindle plate 34. Spindle plate 34 is made sufficiently rugged for the purpose.

BUSHINGS FOR DRIVE SPINDLE CRANKS AS CARRIED BY OSCILLATOR INSERT 96

As shown in FIGURES 1 and 2, the oscillator insert plate 96 is provided with a plurality of axially aligned apertures 174. As shown in FIGURE 2, these are so patterned in oscillator insert plate 96 as to render it dynamically unbalanced relative to its center. In the extended scope of invention, any pattern of such holes can be provided, it being understood that counterbalance of the unit is provided through the counterweight 52 previously described and as shown in FIGURE 1.

Into each aperture 174 there is press-fitted a bushing 176, FIGURE 3. Each bushing 176 has an annular flange 178 at the top end resting against the top surface of oscillator insert 96. Each bushing 176 is also provided with an arcuate shoulder 180 and, as shown in FIGURE 1, this shoulder cooperates with a screw 146 that retains the bushing in position in insert 96.

Referring now to FIGURE 3, note the needle bearing 182 that is press-fitted into the inner bore of the bushing 176 and is thus retained in place. The eccentric crank pin 154 is a slip fit in bearing 182.

A note is in order at this point relative to the bushing 176, bearing 182 assemblies. The total mass of each of these units, no matter what the size of the crank pin 154, is made equivalent to the amount of material, of which the oscillator insert 96 is fabricated, to fill the aperture 174. Thus, with a bushing bearing assembly 176, 182 in each of the apertures 174, the oscillator insert plate 96 effectively has an original mass. Once balanced, it remains so even with different work spindle patterns and even with different work spindle diameter.

THE BOTTOM END OF SHANK 156 AND THE ADAPTER SLEEVE

As shown in FIGURE 3, the bottom end of the shank 156 projects downwardly as a connector portion 184. This is provided with axially spaced and aligned flats 186 and 188 that are disposed as mirror images to one another. Thus, they taper from the perimeter of portion 184 toward the axis, relative to one another.

Referring to FIGURE 1, note that an adapter sleeve assembly 190 is fitted over the connector portion 184. Screws 191 are driven in to abut the surfaces 186 and 188 to lock sleeve 190 to connector portion 184 in proper axial relation. Torsional lock between adapter sleeve 190 and connector portion 184 is provided by means of a Woodruff key 192. This fits within an appropriate half-moon slot in connector portion 184 and an elongated slot 194 extending axially on the inside wall of sleeve 190.

The lower part of adapter sleeve 190 receives an adjustable chuck 196 that is a tubular sleeve type mechanism having an interior bore to receive the shank of a cutting tool such as a drill bit or the like.

The shank 198 of chuck mechanism 196 is retained in axial position as by means of screws, not shown, engaging flats, formed on the outer surface of the shank 198. Torsional lock is provided in the manner of the Woodruff key 192 working in the slot 194, as previously described.

A drill bit 200 or other analogous cutting tool, having an appropriate shank, is retained by adapter 196 in a known manner.

Referring to FIGURE 1, it will be noted that removal of the entire spindle unit, including bit 200, adapter sleeve 190, slip spindle sleeve 142, drive spindle crank 152, and bearings 164, is very simple. Thus, withdrawal of screw 146 permits the entire assembly to slide down and out.

As mentioned above, crank head structure 158 of each work spindle crank 152 has a maximum outside diameter slightly less than the outside diameter of sleeve 142. This permits the entire unit to drop down for removal. Such removal does not change the balance of the oscillator insert 96, because the bushing 176 and bearing 182 remain in place to equal a solid piece of metal filling the aperture 174 at this point. This condition exists whether one or all of the spindle positions are utilized. It will thus be apparent that any pattern within the scope of the total bushing hole pattern of oscillator insert 96 can be developed without changing the balance of the unit.

EXTENDED SCOPE OF INVENTION

The prior discussion has generally related to different drill patterns, without disturbing the balance of the unit. It will be understood that different drill sizes and lengths also can be employed, as for drilling a casting having an uneven top contour, with different drill hole sizes and depths being provided at different points on the piece.

Also, the broad scope of the invention includes not only different drilling or working patterns, but also the use, at the same time, of different sizes of drive spindle shanks and crank pins. Thus, the apertures 150 and 174 can be of any size above a practical minimum. Apertures 150 can be of any size because the slip spindle plate 34 does not affect balance; it is fixed relative to the unit. Apertures 174 can be of any size because the bushings 174 and bearings 182 always compensate for material removed from oscillator insert 96.

While the embodiment of FIGURE 3 has been shown as having the bearings inside the sleeve 142, it is to be understood that such bearings can be spaced apart on shank 156 by appropriate shoulders provided thereon, and the bearings ride directly in apertures 150. Thus, it is to be understood that slip-in assemblies of various sizes and configurations establish the broad scope of invention. In this extension of invention the crank head structures 158 will still operate within the radii of apertures 150.

Where spindles are omitted for a particular pattern, plugs are inserted. These seal bores 150 against leakage of lubricant and against entrance of extraneous materials that might damage the precision of the internal parts. Such plugs, though not shown, have the general configuration of bushings 142, and are solid.

ADVANTAGES

From the foregoing, it will be evident that a highly versatile, multiple spindle head of the parallel motion driving plate type is provided in accordance with the present invention.

The units of invention are adapted to different drill patterns and different sizes of work spindles in practically any combination without disturbing the dynamic balance of the drive plate assembly.

Additionally, the present invention provides a unique and highly durable bearing pad arrangement for support of the drive plate in its operative, translational motion.

What is claimed is:

1. Multiple spindle drive means comprising a drive plate, a plurality of crank pin members having cranks of uniform throw radius received in bushings located in bushing openings in said drive plate, said crank pin members having shanks rotatively received in carrying means, means for non-rotatively translating said drive plate in a circular motion to turn said cranks, means for counterbalancing said drive plate in its said circular motion, the cranks of said crank pin members being connected to said shanks through crank head structures which counterbalance the weight of the cranks with respect to the axes of rotation of the shanks, the mass of said bushings equalling the hypothetical mass of drive plate material necessary to fill the bushing-openings in which the bushings are received.

2. In a multiple spindle drive combination, a translatory movable drive plate, said drive plate having a plurality of axially aligned bushing openings, bushing means secured in each of said openings, a plurality of crank pin members having cranks of uniform throw radium received in said drive plate bushing means, said crank pin members having shanks rotatively received in carrying means, means for translatory moving said drive plate in a circular motion to turn said cranks, means counterbalancing said drive plate in its motion, said cranks of said crank pin members being connected to said shanks through crank head structures which counterbalance the weight of the cranks with respect to the axes of rotation of the shanks, and the mass of each said bushing means equalling the hypothetical mass of drive plate material necessary to fill the bushing openings in which said bushing means are received.

3. In a balanced spindle drive, translatory movable drive means having a fixed mass, means for moving said drive means, said drive means having a recess to receive a drive connecting means, drive connecting means secured in said recess, a crank pin member having a crank received in said drive connecting means, said crank pin having a shank rotatively received in carrying means, means imparting translatory circular motion to said drive means to turn said crank, means counterbalancing said drive means in its motion, means counterbalancing said crank with respect to the axis of rotation of said shank, and the mass of said drive connecting means equalling the hypothetical mass of drive means material necessary to fill said recess in which said drive connecting means is secured.

4. In a multiple spindle drive combination, a drive plate, a plurality of crank pin members having cranks of uniform throw radius received in bushings located in bushing openings in said drive plate, said crank pin members having shanks rotatively received in carrying means, means for translating said drive plate in a circular motion to turn said cranks, means counterbalancing said drive plate in its circular motion, the cranks of said crank pin members being connected to said shank through crank head structures which counterbalance the weight of the cranks with respect to the axes of rotation of the shanks, the mass of said bushings equalling the hypothetical mass of drive plate material necessary to fill the bushing openings in which the bushings are received, said shanks of said crank pin members being rotatively contained in outwardly removable non-rotatable sleeves extended through the carrying means for said shanks, the outside diameters of said crank head structures being contained within imaginary cylindrical projections of their associated sleeves.

5. In a multiple spindle drive combination, a drive plate, a plurality of crank pin members having cranks of uniform throw radius received in bushings located in bushing openings in said drive plate, said crank pin members having shanks rotatively received in carrying means, said shanks of said crank pin members being rotatively contained in outwardly removable sleeves carried by the carrying means for said shanks, the outside diameters of said crank head structures being contained within imaginary cylindrical projections of their associated sleeves, means for translating said drive plate in a circular motion to turn said cranks, means counterbalancing said drive plate in its circular motion, the cranks of said crank pin members being connected to said shanks through crank head structures which counterbalance the weight of the cranks with respect to the axes of rotation of the shanks, and the mass of said bushings equalling the hypothetical mass of drive plate material necessary to fill the bushing openings in which the bushings are received.

6. In a spindle drive means combination, a counterbalanced drive plate, a plurality of crank pin members having cranks of uniform throw radius, the cranks received in bushings located in bushing openings in said drive plate, said crank pin members having shanks, carrying means for said shanks, said shanks being rotatively contained in sleeves carried by said carrying means, said cranks of said crank pin members being connected to said shanks through crank head structures which counterbalance the weight of the cranks with respect to the axes of rotation of the shanks, the outside diameters of said crank head structures being contained within imaginary cylindrical projections of their associated sleeves, means for translating said drive plate in a circular motion to turn said cranks, and the mass of said bushings equalling the hypothetical mass of drive plate material necessary to fill the bushing openings in which the bushings are received.

7. In a balanced drive combination, translatory movable counterbalanced drive means having a fixed mass, means for moving said drive means, said drive means having a recess to receive a drive connecting member, a drive connecting member secured in said recess, the mass of said drive connecting member equalling the hypothetical mass of the drive means material necessary to fill said recess, a crank pin member having a crank received in said drive connecting member, said crank pin member having a shank, carrying means for said shank, said shank being rotatably contained in a cylindrical insert carried by said carrying means, the outside diameter of operation of said crank being contained within an imaginary cylindrical projection of said insert, and the crank of said crank pin member being connected to said shank through a crank head structure which counterbalances the weight of said crank with respect to the axis of rotation of the shank.

8. In multiple spindle drive means, a drive plate, a plurality of crank pin members having cranks of uniform throw radius received in bushings located in bushing openings in said drive plate, said crank pin members having shanks rotatively received in carrying means, means for non-rotatively translating said drive plate in a circular motion to turn said cranks, means for counterbalancing said drive plate in its said circular motion, and the cranks of said crank pin members being connected to said shanks through crank head structures which counterbalance the weight of the cranks with respect to the axes of rotation of the shanks.

9. In a multiple spindle drive combination, a support housing, a translatory movable drive plate carried within said housing, means for moving said drive plate, a plurality of support pads carried by said housing, a plurality of bearing pads carried by said drive plate to move on said support pads, means for establishing a film of lubricant between said support pads and said mounting plates, a rotatable crank spindle carried by said housing and having a crank pin operatively connected to said drive plate, and means for rotating said crank spindle, said support and bearing pads and said crank pin connection retaining said drive plate in a fixed plane of operation, said drive plate having a plurality of axially aligned bushing openings, bushing means received in each of said openings, a plurality of crank pin members having cranks of uniform throw radius in said drive plate bushings, said crank pin members having shanks rotatively received in carrying means, translatory motion of said drive plate being effective to turn said cranks, means counterbalancing said drive plate in its motion, said cranks of said crank members being connected to said shanks through crank head structures which counterbalance the weight of the cranks with respect to the axes of rotation of the shanks, and the mass of each said bushing means equalling the hypothetical mass of drive plate material necessary to fill the bushing openings in which the bushings are received.

10. In a spindle drive, a support housing, a translatory movable drive plate carried within said housing, at least one support pad carried by said housing, at least one bearing pad carried by said drive plate for movement on said support pad, a rotatable crank spindle carried by said housing and having a crank pin operatively connected to said drive plate, said support and bearing pads and said crank pin connection retaining said drive plate in a fixed plane of operation, a crank pin member having a crank rotatively received in a bushing located in said drive plate, said crank pin member having a shank rotatively received in carrying means, means for non-rotatively translating said drive plate in a circular motion to turn said shank, and means for counterbalancing said drive plate.

11. In a crank pin assembly, a crank pin member having a shank and an eccentric crank joined to said shank by crank head structure means, bushing means rotatively receiving said eccentric crank, carrying means rotatively receiving said shank, and said crank structure means counterbalancing the weight of said crank with respect to the axis of rotation of said shank.

12. The invention of claim 11, wherein the diameter of operation of said crank head structure means is within the peripheral limits of said carrying means rotatively receiving said shank.

13. In a crank pin assembly, a crank pin member having a shank and an eccentric crank joined to said shank by crank head structure means, bushing means rotatively receiving said shank, said crank head structure means counterbalancing the weight of said crank with respect to the axis of rotation of said shank, and the mass of said bushing means equalling the hypothetical mass of drive plate material necessary to fill the bushing opening in which said bushing is received.

14. The invention of claim 13 wherein the diameter of operation of said crank head structure means is within the peripheral limits of said carrying means rotatively receiving said shank.

15. In multiple spindle drive means, housing means, drive plate means carried by said housing means, means for nonrotatively translating said drive plate means in a circular motion, means for counterbalancing said drive plate means in its said circular motion, slip spindle plate means carried by said housing means for receiving a plurality of crank pin members driven by said drive plate means, and expanding positioning means for locating each of said slip spindle plate means and said drive plate means relative to said housing means.

References Cited by the Examiner
UNITED STATES PATENTS

| | | | |
|---|---|---|---|
| 1,326,863 | 12/1919 | Heinkel | 74—63 X |
| 1,420,548 | 10/1923 | Sophrer | 74—603 X |
| 2,264,694 | 12/1941 | Griffith | 74—573 |
| 2,414,672 | 1/1947 | Sauer | 74—573 |
| 2,522,736 | 9/1950 | Zager | 74—63 |
| 2,524,207 | 10/1950 | Palmer | 74—603 |

FRED C. MATTERN, Jr., *Primary Examiner.*

BROUGHTON G. DURHAM, *Examiner.*

F. E. BAKER, *Assistant Examiner.*